(12) United States Patent
Kawakami (10) Patent No.: US 9,242,324 B2
(45) Date of Patent: Jan. 26, 2016

(54) CLAMP DEVICE

(75) Inventor: Takayuki Kawakami, Hyogo (JP)

(73) Assignee: Pascal Engineering Corporation, Hyogo (JP)

( * ) Notice: Subject to any disclaimer, the term of this patent is extended or adjusted under 35 U.S.C. 154(b) by 557 days.

(21) Appl. No.: 13/808,181

(22) PCT Filed: May 10, 2011

(86) PCT No.: PCT/JP2011/060765
§ 371 (c)(1),
(2), (4) Date: Jan. 3, 2013

(87) PCT Pub. No.: WO2012/008210
PCT Pub. Date: Jan. 19, 2012

(65) Prior Publication Data
US 2013/0113146 A1 May 9, 2013

(30) Foreign Application Priority Data

Jul. 13, 2010 (JP) ................................. 2010-158643

(51) Int. Cl.
*B23Q 3/08* (2006.01)
*B23Q 1/00* (2006.01)

(52) U.S. Cl.
CPC ................ *B23Q 3/082* (2013.01); *B23Q 1/009* (2013.01)

(58) Field of Classification Search
USPC .......................................................... 269/32
See application file for complete search history.

(56) References Cited

U.S. PATENT DOCUMENTS

| 6,095,509 | A * | 8/2000 | Yonezawa ..................... 269/309 |
| 6,378,855 | B1 * | 4/2002 | Sawdon et al. ................. 269/32 |
| 6,905,117 | B2 * | 6/2005 | Bernhard et al. ............. 269/309 |
| 6,988,720 | B2 * | 1/2006 | Kawakami ..................... 269/309 |
| 7,168,695 | B2 * | 1/2007 | Yonezawa et al. ............ 269/309 |
| 8,235,370 | B2 * | 8/2012 | Kawakami ..................... 269/310 |
| 8,246,029 | B2 * | 8/2012 | Kawakami ..................... 269/310 |
| 8,517,360 | B2 * | 8/2013 | Kawakami ....................... 269/32 |
| 8,585,027 | B2 * | 11/2013 | Kawakami ....................... 269/25 |
| 8,800,982 | B2 * | 8/2014 | Kawakami .................... 269/48.3 |
| 9,033,323 | B2 * | 5/2015 | Kawakami ..................... 269/24 |
| 9,061,385 | B2 * | 6/2015 | Kawakami |
| 2006/0049568 | A1 * | 3/2006 | Yonezawa et al. ............ 269/309 |
| 2011/0133381 | A1 | 6/2011 | Kawakami |

FOREIGN PATENT DOCUMENTS

| DE | 4 020 981 | 1/1992 |
| JP | 11-188551 | 7/1999 |
| JP | 2010-036314 | 2/2010 |

* cited by examiner

Primary Examiner — Lee D Wilson
Assistant Examiner — Alvin Grant
(74) Attorney, Agent, or Firm — Jordan and Hamburg LLP (57) ABSTRACT

A grip member is inserted into an insertion hole of a cylindrical clamp body and is capable of extending outwards to grip the inner circumferential surface of an aperture of an article. A clamp rod is engaged with the grip member; a driving mechanism capable of driving the clamp rod forwards and backwards; a seating surface formed at the top end of the cylindrical clamp body; a case member supporting the cylindrical clamp body movably forwards and backwards; a driving mechanism capable of raising an lowering the cylindrical clamp body; and a lock mechanism having a cylindrical member into which the cylindrical clamp body is inserted so as to slide freely and capable of locking the outer circumferential surface of the cylindrical clamp body by elastically deforming the cylindrical member so as to reduce its diameter.

7 Claims, 6 Drawing Sheets

CLAMP DEVICE

TECHNICAL FIELD

The present invention relates to a clamp device that grips the inner circumferential surface of an aperture in an article such as a workpiece or the like by expanding the diameter of a grip member that is inserted into the aperture, and in particular relates to a clamp device that is endowed with a function of changing the height position of a clamp body in correspondence to the height position of a surface to be supported of the article, and that thereafter is capable of fixating the clamp body.

BACKGROUND OF THE INVENTION

From the prior art, clamp devices of various types such as hole clamps or expansion clamps and so on have been put into practical use. With these clamp devices, the inner circumferential surface of an aperture in an article such as a workpiece is gripped by expanding, with a clamp rod, the diameter of a grip claw portion of a grip member that has been inserted into the aperture as described above, and then the article is pulled towards the clamp body.

For example, the clamp device disclosed in Patent Document #1 includes a clamp body, a grip member, a clamp rod having a tapered shaft portion for expanding the diameter of this grip member, a hydraulic pressure cylinder that drives the clamp rod, and so on. The grip member consists of four separated gripping sections, and grip claw portions, whose shapes in cross section orthogonal to the axis of the clamp rod are flattened D shapes, are formed on these separated gripping sections.

And, the clamp device in Patent Document #2 comprises a clamp body, an annular one piece collet (i.e. a grip member), a pull rod (i.e. a clamp rod), a hydraulic pressure cylinder that drives the pull rod, and so on. Via a single vertically oriented slit, the collet is made so as to be elastically deformable so that its diameter is increased.

With the clamp devices described above, the grip member and the clamp rod are inserted into an aperture in the workpiece, the workpiece is contacted against a seating surface of the clamp body, and, when clamp driving is to be started, the clamp rod (i.e., the pull rod) is shifted downwards and the diameter of the grip member or collet is expanded outwards by the clamp rod, so that it engages and clamps the inner circumferential surface of the aperture in the workpiece.

Patent Document #1: German Patent Publication No. 4,020,981

Patent Document #2: Japanese Laid-Open Patent Publication Heisei 11-188551.

SUMMARY OF THE INVENTION

Now, when a plurality of the clamp devices as in Patent Document #1 or #2 described above are used, and a plurality of locations on the external peripheral portion of a workpiece are clamped for the workpiece to be supplied to machining with the machine tool, first, the grip member of each of the plurality of clamp devices is inserted into an aperture corresponding to that clamp device formed in the workpiece. Next, the surfaces to be supported of the workpiece that correspond to the respective seating surfaces on the top ends of the clamp bodies of the clamp devices are contacted against those seating surfaces, the clamp devices are driven to be clamped, and the inner circumferential surfaces of the apertures in the workpiece are all put into the state of being gripped by the respective grip members, and are clamped.

However, if the plurality of surfaces to be supported are at different height positions, or if, although the plurality of surfaces to be supported are at the same height position, there is some deviation between the surfaces to be supported, then there is the problem that the machined plane may be somewhat irregular after machining. In concrete terms if, after the external peripheral portion of the workpiece has been clamped at three locations, it is then clamped at one more location, then there is a fear that the workpiece may be clamped in a state in which it is not reliably contacted against all the seating surfaces of the clamp body, or that the workpiece may be clamped in a state in which it is slightly distorted, both of which would be undesirable. If, due to this, the workpiece is supplied to machining in an imperfectly clamped state, then there is the problem that the machining accuracy may be deteriorated due to elastic deformation of the workpiece or due to chattering vibration.

The object of the present invention is to provide a clamp device that is endowed, with a function by which the height position of the clamp body can be changed to correspond to the surface to be supported of the article, with making it possible thereafter to fix the clamp body.

The present invention presents a clamp device comprising a cylindrical clamp body, a grip member that passes through a through hole in a top end portion of the cylindrical clamp body and extends to an exterior and is capable of gripping an inner circumferential surface of an aperture in an article, a clamp rod that is engaged with the grip member and extends in a vertical direction, and a forwards/backwards driving mechanism capable of driving the clamp rod forwards and backwards, characterized by comprising: a seating surface formed at a top end of the cylindrical clamp body, on which the article is seated; a case member that supports the cylindrical clamp body so that it can move forwards and backwards; an elevating/lowering driving mechanism that is capable of driving the cylindrical clamp body with respect to the case member in a direction parallel to an axis of the clamp rod to move up and down; and a lock mechanism having a cylindrical member through which the cylindrical clamp body is passed so as to slide freely and which is supported by the case member, and that is capable of locking an outer circumferential surface of the cylindrical clamp body by elastically deforming the cylindrical member so as to reduce its diameter.

According to the present invention, when clamp driving is started, it is possible for the cylindrical clamp body to be elevated (i.e. advanced) with respect to the case member by the elevating/lowering driving mechanism, and it is possible to make the seating surface at the end of the cylindrical clamp body contact against an article such as a workpiece or the like. And, when the clamping is to be released, it is possible for the cylindrical clamp body to be lowered (i.e. retracted) with respect to the case member by the elevating lowering mechanism, and it is possible to make the seating surface at the end, of the cylindrical clamp body retract away from the article.

Since the cylindrical member is provided in which the cylindrical clamp body is inserted to slide freely and that is supported by the case member, and the lock mechanism is provided that is capable of locking the outer circumferential surface of the cylindrical clamp body by elastically deforming the cylindrical member so as to reduce its diameter, accordingly, with this lock mechanism, it is possible reliably to perform locking by elastically deforming the cylindrical member so as to reduce its diameter, thus exerting static frictional force against the outer circumferential surface of the cylindrical clamp body.

Accordingly since, when clamp driving is started, it is possible to elevate the cylindrical clamp body so that it corresponds to the height position of the surface to be supported of the article, and it is possible then to lock the cylindrical clamp body with the lock mechanism in the state in which the article is contacted against the seating surface at the top end of the cylindrical clamp body, and since thereafter it is possible to expand the diameter of the grip member by shifting the clamp rod to the retraction side with the forwards/backwards driving mechanism, thus putting the grip member into the gripping state in which it bites into the inner circumferential surface of the aperture in the article, accordingly it is possible to ensure planarity of the surface to be machined of the article, and it is possible to suppress deterioration of the machining accuracy due to elastic deformation of the article or due to chattering vibration.

In addition to the structure of the present invention described above, it would also be acceptable to employ structures of the types that follow.

(1) The elevating/lowering driving mechanism may comprise a fluid pressure cylinder that is provided within the case member; the fluid pressure cylinder may comprise a fluid pressure operation chamber to which fluid pressure is supplied, a piston member that receives fluid pressure in the fluid pressure operation chamber and is thereby driven to the advance side, and a spring member that biases the piston member to the retraction side; and the piston member may comprise a piston rod that is inserted into an annular piston member of the forwards/backwards driving mechanism and may comprise a flange shaped engagement member at the top end portion of the piston rod that is operationally linked to the annular piston member.

According to this structure, when fluid pressure is supplied to the fluid pressure operation chamber, it is possible for the piston member to be shifted to the advance side, and for the annular piston member to be shifted to the advance side via the flange shaped engagement member of the piston rod. And, when fluid, pressure is discharged from the fluid pressure operation chamber, it is possible for the piston member to be shifted to the retraction side by the spring member, and for the annular piston member to be shifted to the retracted side via the flange shaped engagement member.

(2) In (1), the lock mechanism may comprise a thin barrel portion that is formed in the cylindrical member and that is fitted over the exterior of the cylindrical clamp body, an external circumferential fluid chamber that is formed around the external circumference of the thin barrel portion, and a first fluid pressure supply passage that is capable of supplying fluid pressure to the external circumferential fluid chamber.

According to this structure, when fluid pressure is supplied to the external circumferential fluid chamber via the first fluid pressure supply passage, the thin barrel portion is elastically deformed so as to reduce its diameter, and the cylindrical clamp body can thereby be reliably locked.

(3) In (2), the first fluid pressure supply passage may be a passage that communicates the external circumferential fluid chamber and the fluid pressure operation chamber of the fluid pressure cylinder.

According to this structure, it is possible to supply the fluid pressures from a common fluid pressure supply source.

(4) In (1), the lock mechanism may comprise: one or a plurality of slits and a tapered outer circumferential surface formed in the cylindrical member; an annular member having a tapered inner circumferential surface that is disposed around the external circumference of the cylindrical member, and that is fitted into the case member; a tapered annular gap that is defined between the annular member and the cylindrical member; a plurality of metallic spheres that are fitted into the tapered annular gap; an annular fluid chamber that is defined at the external circumferential side of the annular member; a second fluid pressure supply passage that is capable of supplying fluid pressure to the annular fluid chamber; and a return spring that biases the annular member to the lock release side.

According to this structure, when fluid pressure is supplied to the annular fluid chamber via the second fluid pressure supply passage, the tapered outer circumferential surface and the tapered inner circumferential surface are engaged together via the plurality of metallic spheres, whereby the cylindrical member is elastically deformed so as to reduce its diameter, and the cylindrical clamp body can thereby be reliably locked.

(5) In (4), the second fluid pressure supply passage may be a passage that communicates the annular fluid chamber and the fluid pressure operation chamber of the fluid pressure cylinder.

According to this structure, it is possible to supply the fluid pressures from a common fluid pressure supply source.

(6) In (4), when fluid pressure is supplied to the annular fluid chamber, the annular member may be shifted relative to the cylindrical member in the direction parallel to the axis of the clamp rod, whereby the cylindrical member is elastically deformed so that its diameter is reduced. According to this structure, it is possible reliably to lock the cylindrical clamp body by elastically deforming the cylindrical member with the annular member so as to reduce its diameter.

DESCRIPTION OF THE PREFERRED EMBODIMENTS

In the following, the present invention will be explained on the basis of embodiments of best modes for implementation thereof.

Embodiment 1

Figure 1:
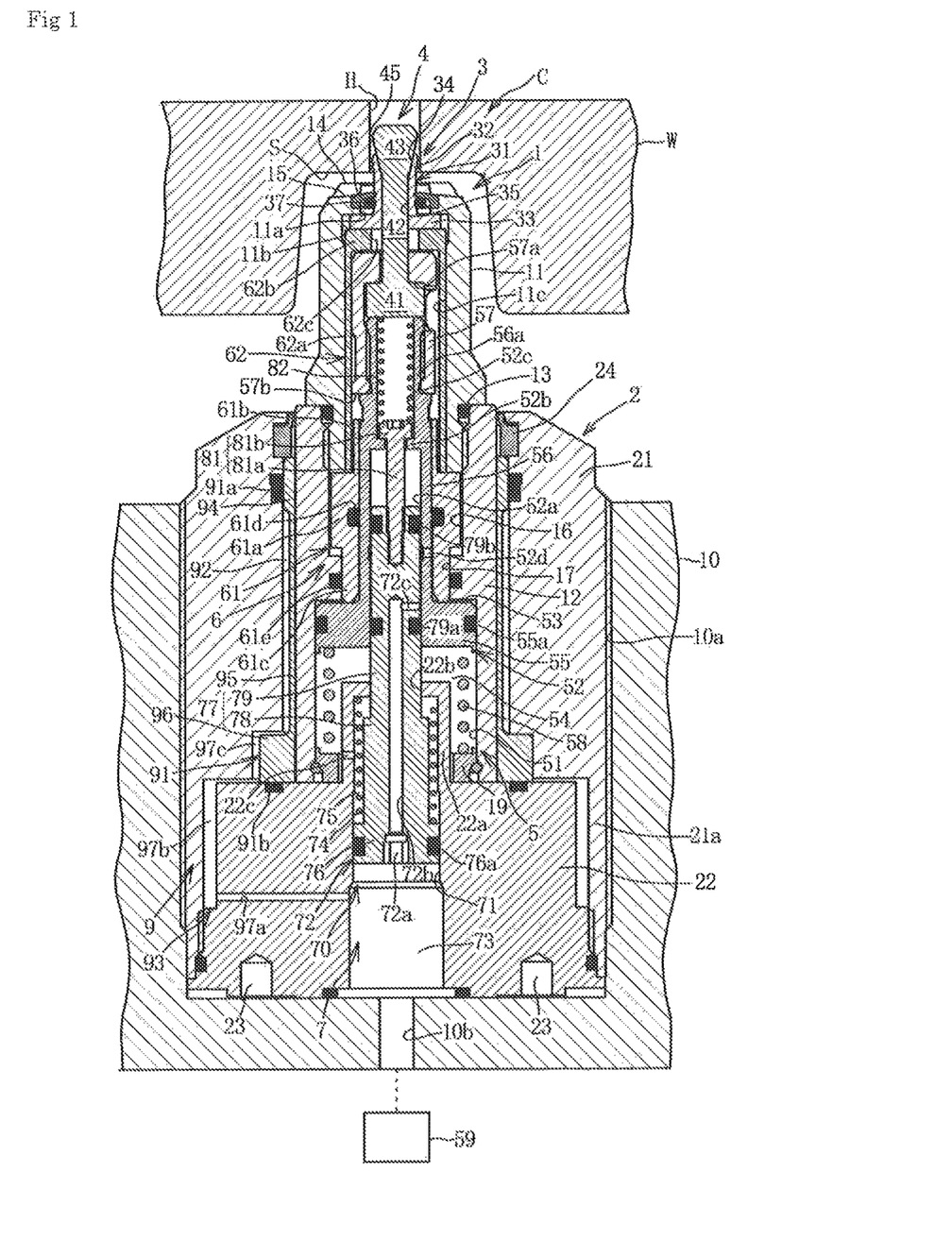
FIG. 1 is a sectional view of a clamp device in the unclamped state according to a first embodiment of the present invention.
Figure 2:
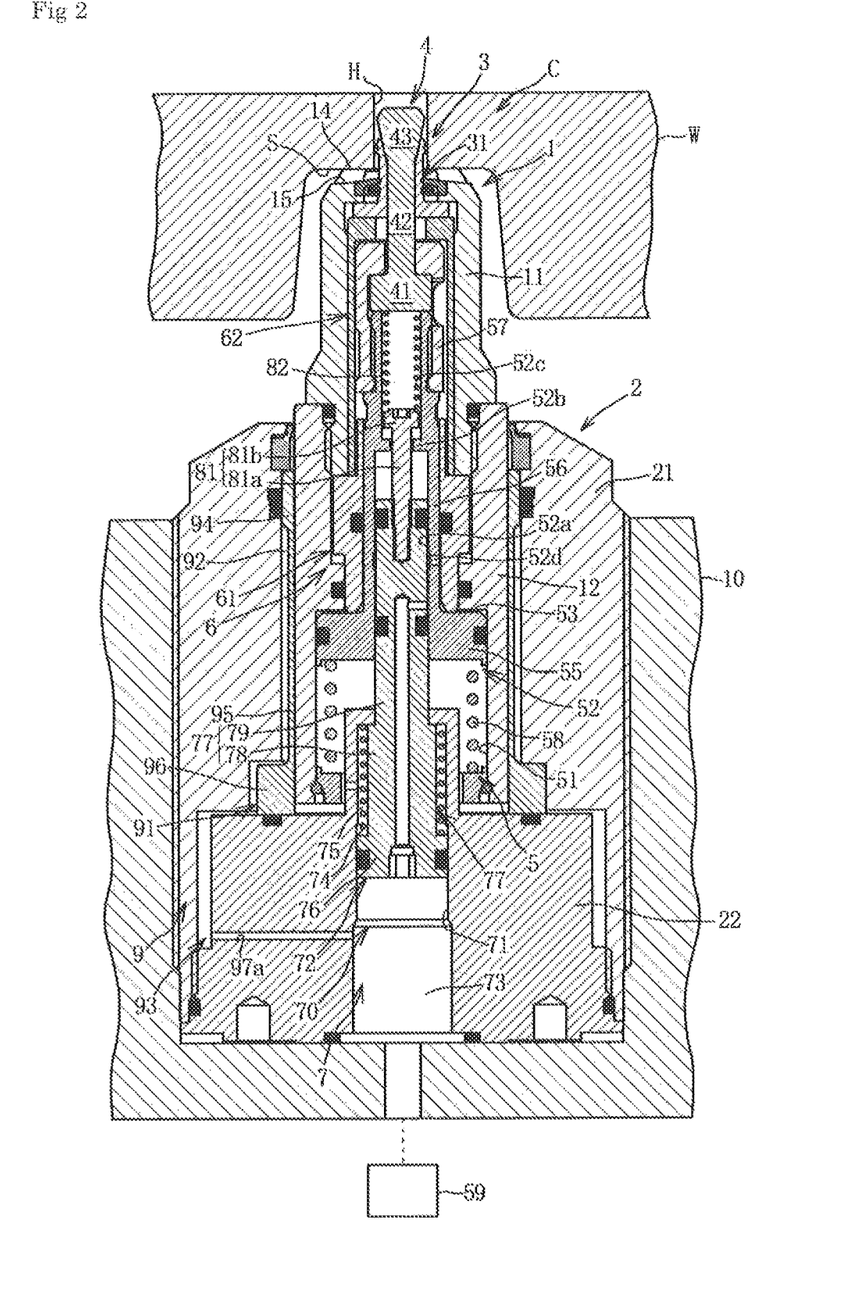
FIG. 2 is a sectional view of the clamp device in a state in which a workpiece is contacted against a seating surface of a cylindrical clamp body and the cylindrical clamp body is in a state of being locked by a cylindrical member.
Figure 3:
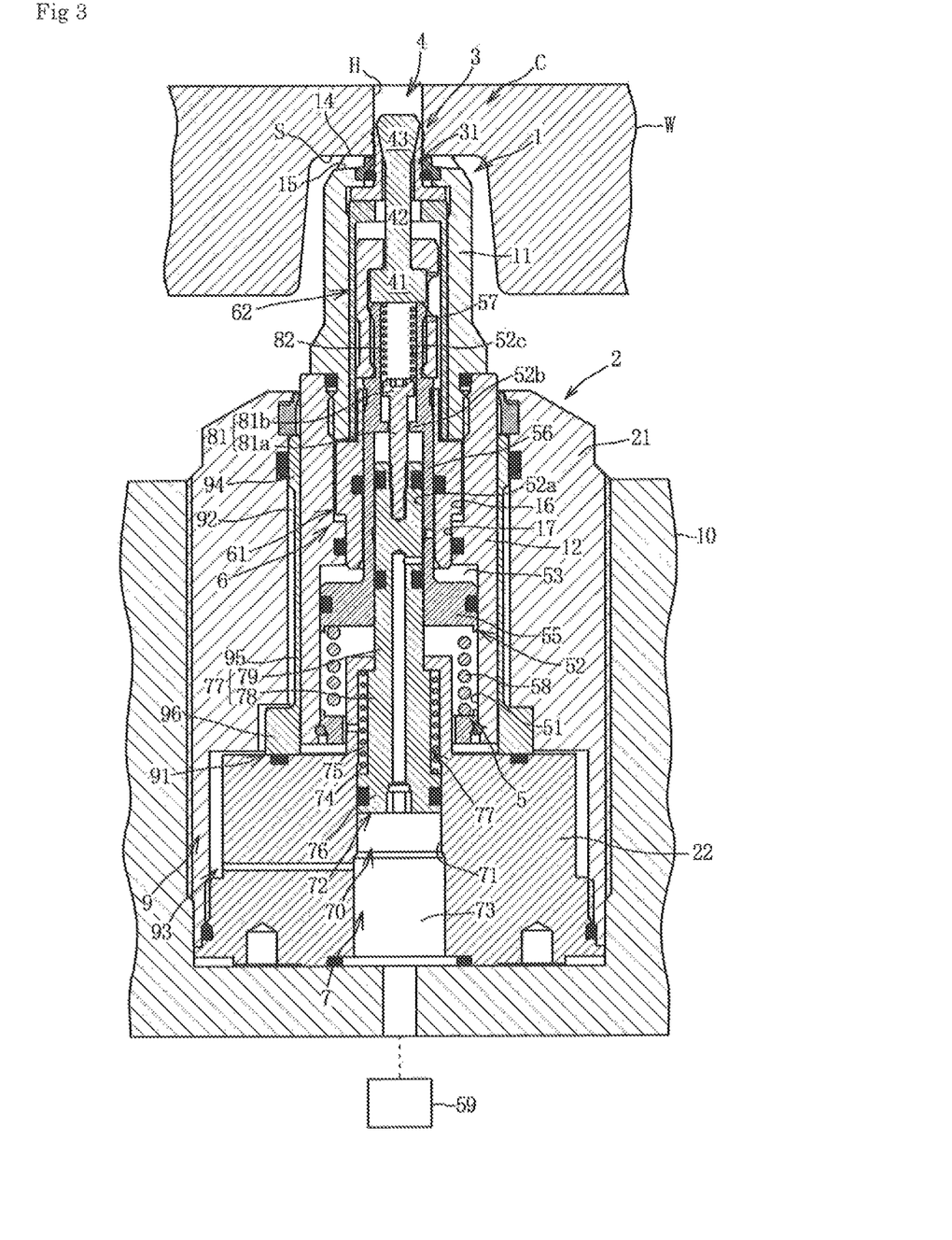
FIG. 3 is a sectional view of the clamp device in the clamped state.

As shown in FIGS. 1 through 3, this clamp device C is one in which, after a surface to be supported S of a workpiece W (i.e. an article) to be supplied to machine processing has been supported from below, and a cylindrical clamp body 1 has been fixated, the inner circumferential surface of an aperture H in the workpiece W is put into a state of being gripped by a grip member 3. This clamp device C comprises a cylindrical clamp body 1, a case member 2 that supports the cylindrical clamp body 1 so that it can move forwards and backwards, the grip member 3, a clamp rod 4, a forwards/backwards driving mechanism 5 that can drive the clamp rod 4 forwards and backwards, a support mechanism 6 that supports the clamp rod 4, an elevating/lowering driving mechanism 7 that can drive the cylindrical clamp body 1 to be raised and lowered (to be moved up and down), and a lock mechanism 9 that can fixate the outer circumferential surface of the cylindrical clamp body 1.

First, the cylindrical clamp body 1 will be explained.

As shown in FIGS. 1 through 3, the cylindrical clamp body 1 is formed as a cylinder that extends in the vertical direction, and comprises an upper body barrel portion 11 and a lower body barrel portion 12. The lower end portion of the upper body barrel portion 11 is fitted into and screwingly engaged with the upper end portion of the lower body barrel portion 12, and a seal member 13 seals between the upper body barrel portion 11 and the lower body barrel portion 12. The grip member 3 and the clamp rod 4 are disposed so as to pass vertically through a through hole 11a that is pierced through the center portion of the upper end portion of the upper body barrel portion 11. Four seating surfaces 14 that are shaped as circular arcs are formed on the top end of the cylindrical clamp body 1, in other words on the upper surface of the upper body barrel portion 11, with a workpiece W being seated on them and surrounding the through hole 11a, and the workpiece W is clamped in the state in which it is seated on these seating surfaces 14. And four concave grooves 15 are formed on the upper surface of the upper body barrel portion 11 in the shape of a cross, with pressurized air being blown to flow through them.

The outer diameter of is formed to be slightly larger than the outer diameter of the upper body barrel portion 11, and the lower body barrel portion 12 is fitted into the case member 2 and is inserted into the cylindrical member 91 and is supported so as to be movable forwards and backwards (i.e. up and down) in the vertical direction. A reception hole 16, a cylindrical hole 17, and a cylindrical hole 51 are formed within the lower body barrel portion 12, in that order from above downwards. A ring member 19 is installed at the internal circumference of the lower end portion of the lower body barrel portion 12 via a C shaped ring. In the unclamped state, the lower end portion of the lower body barrel portion 12 is contacted against the upper surface of a lower case member portion 22 of the case member 2.

Next, the case member 2 will be explained.

As shown in FIGS. 1 through 3, the case member 2 is formed to be circular as seen in plan view, and comprises a cylindrical case member 21 that is formed as a cylinder with both of its ends open, and the thick lower case member portion 22 that is fitted into and screwingly engaged with the lower end portion of the cylindrical case member 21. The cylindrical, clamp body 1 and the forwards/backwards driving mechanism 5, the elevating/lowering driving mechanism 7 and the lock mechanism 9 that will be described hereinafter are installed within the case member 2. An enlarged portion of the external circumferential portion of the case member 2 is screwingly engaged into an installation aperture 10a in a base member 10 that is formed to have a bottom, and is thereby attached to the base member 10. A vertically oriented cylindrical hole 71 is formed in the lower case member portion 22. And a pair of engagement holes 23, into which a tool for screwing engagement with the cylindrical case member 21 can be engaged, are formed in the lower end portion of the lower case member portion 22. A dust seal 24 for preventing the ingress of swarf or dust, and the cylindrical member 91 of the lock mechanism 9 that will be described hereinafter, are installed between the lower body barrel portion 12 and the case member 2, sequentially in that order from above downwards.

Next, the grip member 3 will be explained.

As shown in FIGS. 1 through 3, the grip member 3 is passed through the through hole 11a in the top end portion of the cylindrical clamp body 1 along with the clamp rod 4 and projects to the exterior, and is capable of gripping the inner circumferential surface of the aperture H of the workpiece W. This grip member 3 is composed of four separated gripping sections 31 that are made from steel, disposed at regular intervals around the external circumference of the clamp rod 4. The diameter of the four separated gripping sections 31 can be expanded and contracted. Grip claw portions 32 are formed at the upper portions of the separated gripping sections 31, and base end flange portions 33 that are shaped as circular arcs are formed at the lower end portions of the separated gripping sections 31. Straight surfaces 35 are formed on the inner surface of lower half portions of the separated gripping sections 31, and extend parallel to the axis of the clamp rod 4.

The length of the grip claw portions 32 in the vertical direction is around ⅓ of the total length of the grip member 3. The horizontal cross sections of the grip claw portions 32 are formed in flattened D shapes. Tapered surfaces 34 that recede from the axis of the clamp rod 4 in the upward direction are formed on the inner surfaces of the upper portions of the grip claw portions 32, and these tapered surfaces 34 can engage with a tapered surface 45 of a tapered portion 43 of the clamp rod 4 in a closely contacted state. Teeth for gripping the inner circumferential surface of the aperture H of the workpiece W are formed in two steps on the outer peripheral surfaces of the grip claw portions 32.

As shown in FIGS. 1 through 3, a scraper 36 is installed in the through hole 11a of the upper barrel portion 11 so as to close the annular gap with the external peripheries of the grip member 3 and the clamp rod 4. The scraper 36 slides in contact with the outer peripheral surfaces of the grip member 3 and the clamp rod 4, and is made from a material such as rubber or synthetic resin that is endowed with resilience. The scraper 36 is a member for preventing the ingress of foreign matter such as swarf or the like from the annular gap at the external peripheries of the grip member 3 and the clamp rod 4 to the interior, for making it difficult for pressurized air to leak to the outside from within the clamp body 1, and for holding together the four separated gripping sections 31 and the clamp rod 4. An O ring 37 is installed on the lower portion of the grip member 3 and biases the four separated gripping sections 31, which are physically separated from one another, in the radially inward direction.

The base end flange portions 33 of the grip member 3 are received in a circular concave portion 11b of the upper body barrel portion 11, and a gap is defined at the external peripheries of the base end flange portions 33. The base end flange portions 33 of the grip member 3 are held between an upper wall portion of the circular concave portion 11b and a horizontal plate portion 62b of the support member 62, so as to be shiftable in the horizontal direction, and are supported by the support member 62. Along with the grip member 3 being capable of being elevated and lowered integrally with the support member 62 and an annular pressure reception member 61, it is also installed so as to be shiftable in the horizontal direction orthogonal to the axis of the clamp device C, due to the annular gap at the external circumference of the circular concave portion 11b, and via elastic deformation of the scraper 36.

Next, the clamp rod 4 will be explained.

As shown in FIGS. 1 through 3, the clamp rod 4 passes through the grip member 3 and engages with the grip member 3 and extends in the vertical direction. The clamp rod 4 comprises a T shaped engagement portion 41 at its lower end portion, a rod portion 42 that continues upwards from this T shaped engagement portion 41 and whose upper half portion contacts against the straight surface 35 of the grip member 3, and a tapered portion 43 that continues upward from the rod portion 42 and that is formed so that its diameter increases upwards, and that can be driven so as to increase the diameter of the four separated gripping sections 31. Four tapered surfaces 45 are formed on the tapered portion 43 at regular intervals around its circumferential direction, and the grip claw portions 32 of the four separated gripping sections 31 contact against these tapered surfaces in a surface contacting manner.

Next, the forwards/backwards driving mechanism 5 will be explained. As shown in FIGS. 1 through 3, the forwards/backwards driving mechanism 5 comprises a vertically oriented cylindrical hole 51 that is formed in the lower half portion of the lower body barrel portion 12, an annular piston member 52, a hydraulic chamber for clamping 53 above an annular piston portion 55 of the annular piston member 52, a spring reception chamber 54 below the annular piston portion 55, and so on. The forwards/backwards driving mechanism 5 is built as a hydraulic pressure cylinder that drives the clamp rod 4 to retract with respect to the cylindrical clamp body 1 (clamp driving) due to hydraulic pressure, and that drives it to advance (unclamping driving) due to the elastic biasing force of a spring member 58.

The annular piston member 52 comprises an annular piston portion 55 that is installed in the cylindrical hole 51 in an oil-tight manner so as to slide freely, and a cylindrical piston rod 56 that extends upwards from the annular piston portion 55 to the interior of the upper body barrel portion 11. The external circumferential portion of the annular piston portion 55 is sealed in an oil-tight manner by a seal member 55a. A cylindrical hole 52a of approximately ⅗ of the total length of the annular piston member 52 is formed in the lower half portion of the annular piston member 52 from its lower end portion, and a spring reception hole 52c of smaller diameter than the cylindrical hole 52a and separated therefrom by an intermediate wall portion 52b is formed in the upper half portion of the annular piston member 52.

A screw shaft portion 56a is formed on the upper end portion of the cylindrical piston rod 56, and a T groove forming member 57, in which an inverted T shaped T groove 57a is formed, is attached to the screw shaft portion 56a by being screwingly engaged thereon. A T shaped engagement portion 41 of the clamp rod 4 is engaged from a horizontal direction into the T groove 57a of the T groove forming member 57. An engagement reception portion 57b that is engaged with the upper end of a thin sleeve 61b of the annular pressure reception member 61 is formed at the lower end of the T groove forming member 57. Since there is a slight clearance between the T shaped engagement portion 41 and the T groove shaped member 57, accordingly it is possible for the clamp rod 4 to be shifted in the horizontal direction relatively to the T groove forming member 57.

The hydraulic chamber for clamping 53 is defined by the lower body barrel portion 12, the annular piston member 52, and the annular pressure reception member 61 that will be described hereinafter. Hydraulic pressure to bias the annular piston portion 55 towards the clamping side (i.e. downwards) can be supplied to the hydraulic chamber for clamping 53 from a hydraulic pressure supply source 59 via a hydraulic pressure operation chamber 73 of the elevating/lowering driving mechanism 7, hydraulic passages 72b, 72c formed in the piston member 72, an annular clearance between the piston member 72 and the annular piston member 52, a hydraulic passage 52d that consists of a small hole formed in the cylindrical piston rod 56 and an annular clearance between the annular piston member 52 and the annular pressure reception member 61.

The spring reception chamber 54 is defined by the lower body barrel portion 12, the ring member 19, the annular piston member 52, and the lower case member portion 22. A spring member that exerts unclamping driving force in the upward direction is received in the spring reception chamber 54 in the compressed state. The spring member 58 is installed in the state of being fitted over the piston member 72 of the elevating/lowering driving mechanism 7 and a cylindrical hole definition portion 22a that is formed on the lower case member portion 22 to project upwards. The lower end of the spring member 58 is received by the ring member 19, while the upper end of the spring member 58 is received by the lower end surface of the annular piston portion 55, and thus the annular piston portion 55 is elastically biased upwards. It should be understood that, while here the spring member 58 is made from a spring steel wire material having a circular cross section, it would also be acceptable to arrange for it to be made from a spring steel wire material having a rectangular cross section.

Next, the support mechanism 6 will be explained.

As shown in FIGS. 1 through 3, the support mechanism 6 comprises the annular pressure reception member 61 that is fitted over the cylindrical piston rod 56 of the annular piston member 52 so as to be movable, the support member 62 whose base end portion (i.e. whose lower end portion) is supported by the annular pressure reception member 61 and that supports the base end of the grip member 3, and a support hydraulic chamber that consists of the hydraulic chamber for clamping 53 that applies hydraulic pressure to the annular pressure reception member 61 in the opposite orientation to the clamp direction. When the diameter of the grip member 3 is expanded and it is made to grip the inner circumferential surface of the aperture H in the workpiece W, the support mechanism 6 supports the grip member 3 with the hydraulic pressure force that operates on the annular pressure reception member 61.

The annular pressure reception member 61 comprises a large diameter portion 61a, a thin sleeve 61b that extends upwards by a predetermined length from the inner peripheral portion of the upper end of the large diameter portion 61a, and a small diameter piston portion 61c whose upper end portion continues on downwards from the lower end of the large diameter portion 61a and projects into the hydraulic chamber for clamping 53. The annular pressure reception member 61 is fitted over the cylindrical piston rod 56 so as to slide freely thereover, and is fitted into the reception hole 16 and the cylindrical hole 17 of the lower body barrel portion 12 so as to slide freely therein. The internal circumferential portion of the annular pressure reception member 61 is sealed in an oil tight manner by a seal member 61d, and its external circumferential portion is sealed in an oil tight manner by a seal member 61e. When the annular pressure reception member 61 is at its lower limit position, the lower end surface of its large diameter portion 61a is received and stopped by the lower end wall of the reception hole 16; and, when the annular pressure reception member 61 is at its upper limit position, the upper end surface of the large diameter portion 61a is received and stopped by the lower end portion of the upper body barrel portion 11.

The support member 62 comprises a barrel portion 62a that is fitted into an inner reception hole 11c of the upper body barrel portion 11 and over the cylindrical piston rod 56, the T groove forming member 57, and the thin sleeve 61b, and a horizontal plate portion 62b at the upper end of the barrel portion 62a. The clamp rod 4 passes through a circular hole 62c in the horizontal plate portion 62b. This circular hole 62c has a size such that the clamp rod 4 can pass through it. The horizontal plate portion 62b at the upper end of the support member 62 contacts against and supports the lower surfaces of the base end flange portions 33 of the grip member 3, the lower end of the barrel portion 62a contacts against and is supported by the upper end of the large diameter portion 61a of the annular pressure reception member 61, and the support member 62 is elevated and lowered integrally with the annular pressure reception member 61.

Next, the elevating/lowering driving mechanism 7 will be explained. As shown in FIGS. 1 through 3, the elevating/lowering driving mechanism 7 comprises a hydraulic pressure cylinder 70 (i.e. a fluid pressure cylinder) that is provided within the case member 2, and the hydraulic pressure cylinder 70 comprises a vertically oriented cylindrical hole 71, a piston member 72 that receives hydraulic pressure and is driven towards the advance side (i.e. upwards), a hydraulic pressure operation chamber 73 (i.e. a fluid pressure operation chamber) defined by the cylindrical hole 71 and to which hydraulic pressure (i.e. fluid pressure) is supplied, a spring member 74 that biases the piston member 72 towards the retraction side (i.e. downwards), and a spring reception chamber 75 that receives the spring member 74. The elevating/lowering driving mechanism 7 is capable of driving the cylindrical clamp body 1 and its internal mechanism with respect to the case member 2 so as to raise and lower it in the direction parallel to the axis of the clamp rod 4.

The piston member 72 comprises a piston portion 76 that is inserted into the cylindrical hole 71 so as to slide freely in an oil tight manner, and a piston rod 77 that extends upwards from the piston portion 76. The piston rod 77 is integrally formed from a large diameter rod portion 78 and a small diameter rod portion 79 that extends upwards from the large diameter rod portion 78 and passes through an opening portion 22b. The external circumferential portion of the piston portion 76 is sealed in an oil tight manner by a seal member 76a, and the external circumferential portion of the small diameter rod portion 79 is sealed in an oil tight manner by seal members 79a, 79b. A hexagonal aperture 72a is formed at the lower end portion of the piston member 72, and a hydraulic passage 72b that extends upwards from the hexagonal aperture 72a and a hydraulic passage 72c that is orthogonal to the upper end portion of the hydraulic passage 72b are formed in the interior of the piston member 72.

The small diameter rod portion 79 is inserted into the cylindrical hole 52a of the annular piston member 52 so as to slide freely in an oil tight manner. This piston member 72 has a flange shaped engagement member 81 at the top end portion of the piston rod 77 that is linked operatively to the annular piston member 52. A small diameter portion 81a of the flange shaped engagement member 81 extends through an aperture in the intermediate wall portion 52b into the interior of the spring reception hole 52c. And a flange portion 81b is formed at the end portion of the small diameter portion 81a, positioned in the spring reception hole 52c. When the piston member 72 is retracted downward, the flange portion 81b contacts against the intermediate wall portion 52b from above, so that the annular piston member 52 is shifted downwards, and so that the cylindrical clamp body 1 is shifted downwards via the spring member 58 and the ring member 19.

A hydraulic pressure operation chamber 73 is formed below the piston portion 76 of the piston member 72, and a spring reception chamber 75 is formed above the piston portion 76. Hydraulic pressure is supplied from a hydraulic pressure supply source 59 to the hydraulic pressure operation chamber 73 via a hydraulic passage 10b in the base member 10. A spring member 74 is received in the spring reception chamber 75 in a compressed state, and is installed around the large diameter rod portion 78. This spring member 74 elastically biases the piston portion 76 in the downward direction (i.e. towards the retraction side). Via a breathing hole 22c that is formed in the cylindrical hole definition portion 22a of the lower case member portion 22, the spring reception chamber 75 is in the state of being opened to the atmosphere.

A compact spring member 82 whose elastic biasing force is weak is received in the compressed state within the spring reception hole 52c of the annular piston member 52. The lower end portion of the compact spring member 82 is received and stopped by the upper surface of the flange portion 81b of the flange shaped engagement member 81, and the upper end portion of the compact spring member 82 contacts against the lower end surface of the clamp rod 4. When the piston member 72 advances and shifts upward, the flange shaped engagement member 81 compresses the compact spring member 82 and presses it in the upward direction, and, due to the elastic biasing force of the compact spring member 82, the cylindrical clamp body 1 is shifted upwards via the clamp rod 4, the T groove forming member 57, and the annular piston member 52.

Next, the lock mechanism 9 will be explained.

As shown in FIGS. 1 through 3, the lock mechanism 9 comprises a cylindrical member 91 into which the cylindrical clamp body 1 is inserted and contacted so as to slide freely therein, and that is supported on the case member 2, an annular external circumferential hydraulic chamber 92 (i.e. an external circumferential fluid chamber) that is formed around the external periphery of a thin barrel portion 95 of the cylindrical member 91, and a hydraulic pressure supply passage 93 (i.e. a first fluid pressure supply passage) that can supply hydraulic pressure to the external circumferential hydraulic chamber 92. The lock mechanism 9 is a mechanism that can lock the outer peripheral surface of the cylindrical clamp body 1 by the cylindrical member 91 being elastically deformed so that its diameter is reduced.

The cylindrical member 91 is made from metal, and is integrally formed, sequentially in order from above downwards, from a fixed annular upper portion 94, the thin barrel portion 95 that is fitted over the cylindrical clamp body 1, and a fixed annular lower portion 96. The cylindrical member 91 is tightly fitted over the outer peripheral surface of the cylindrical clamp body 1, and is made to be elastically deformable so that its diameter can be reduced. The thin barrel portion 95 is formed so as to be fitted around a larger portion at an intermediate portion of the cylindrical member 91 in the length direction. The fixed annular upper portion 94 is engaged to the upper end portion of the case member 2 by a dust seal 24. And the fixed annular lower portion 96 is received in a circular concave portion 97c of the case member 2, and is held and fixed between the cylindrical case member 21 and the lower case member portion 22. Both the upper and lower ends of the external circumferential hydraulic chamber 92 at the external periphery of the cylindrical member 91 are sealed in an oil tight manner by seal members 91a and 91b.

The hydraulic pressure supply passage 93 is a passage that communicates the external circumferential hydraulic chamber 92 with the hydraulic pressure operation chamber of the hydraulic pressure cylinder 70. The hydraulic pressure supply passage 93 comprises a hydraulic passage 97a that is formed in the lower case member portion 22 in a horizontal orientation, an annular hydraulic passage 97b that is defined by the gap between the lower barrel portion 21a of the cylindrical case member 21 and the lower case member portion 22, one or a plurality of fine diameter hydraulic passages 97c formed between the case member 2 and the fixed annular lower portion 96 that operate as throttles. When, via these hydraulic passages 97a through 97c, hydraulic pressure is supplied to the external circumferential hydraulic chamber 92 from the hydraulic pressure operation chamber 73 to which hydraulic pressure is supplied by the hydraulic pressure supply source 59, then the thin barrel portion 95 is elastically deformed so that its diameter is reduced, and accordingly it locks the cylindrical clamp body 1.

It should be understood that a pressurized air introduction means is provided to the clamp device C in order to blow air against the grip member 3, the clamp rod 4, and the seating surfaces 14, and pressurized air may be introduced to within the cylindrical clamp body 1 by this pressurized air introduction means; but, in this embodiment, this feature is omitted from the drawings.

Next, the operation of the clamp device C will be explained.

When a workpiece W that is to be supplied, to machining is to be clamped by a plurality of the clamp devices C, initially, the hydraulic pressure in the hydraulic pressure operation chamber 73 of the elevating/lowering driving mechanism 7 is vented to drain pressure as shown in FIG. 1. In this state, due to the biasing force of the spring member 58 of the forwards/backwards driving mechanism 5, the clamp rod 4, the grip member 3, the annular piston member 52, and the annular pressure reception member 61 are in their upper limit positions. The workpiece W is set onto the clamp device C from above, and, after the external peripheral portion of the workpiece W has been fixated by a plurality of clamp devices other than the clamp device C, not shown in the figures, then hydraulic pressure at a comparatively low pressure level (for example 1 MPa) is supplied from the hydraulic pressure supply source 59 to the hydraulic pressure operation chamber 73. It should be understood that the thin barrel portion 95 of the cylindrical member 91 is made so as not to be elastically deformed by hydraulic pressure of this low level. Moreover, the spring member 58 that is used in the forwards/backwards driving mechanism 5 has a biasing force that is greater than the drive force in the downward direction that is exerted on the annular piston member 52 by this low hydraulic pressure.

When this is done, the hydraulic pressure cylinder 70 operates, and, along with the piston member 72 shifting upwards against the biasing force of the spring member 74, the flange shaped engagement member 81 moves away from the intermediate wall portion 52b and shifting forwards of the annular piston member 52 becomes possible. At this time, although the low hydraulic pressure is also supplied to the external circumferential hydraulic chamber 92, the cylindrical clamp body 1 is not locked by the cylindrical member 91, since the thin barrel portion 95 is not elastically deformed to reduce its diameter by this low hydraulic pressure. Moreover, the annular piston member 52 does not shift downwards, since the biasing force of the spring member 58 of the forwards/backwards driving mechanism 5 is larger than the drive force generated by the low hydraulic pressure on the annular piston member 52. Accordingly, along with the clamp rod 4 being driven forwards (i.e. upwards) due to the weak elastic biasing force of the compact spring member 82, also the cylindrical clamp body 1 is driven forwards via the annular piston member 52 and the annular pressure reception member 61.

As a result, the seating surfaces 14 of the cylindrical clamp body 1 support the workpiece W while gently contacting against the surface to be supported S of the workpiece W with a weak force, and the cylindrical clamp body 1 is held in the stopped state. Since the seating surface 14 of the cylindrical clamp body 1 is contacted lightly against the surface to be supported S of workpiece W, no elastic deformation of the workpiece W takes place. At this time the boundary step portion of the piston member 72, between its large diameter rod portion 78 and its small diameter rod portion 79, shifts upwards so far as to contact against the upper wall portion of the cylindrical hole 71, but a large portion of the drive force of the piston member 72 in the upward direction is absorbed due to the shock absorption operation of the compact spring member 82. After the seating surfaces 14 of the cylindrical clamp body 1 have contacted against the surface to be supported S of the workpiece W, when a hydraulic pressure that is higher than the abovementioned low hydraulic pressure is supplied from the hydraulic pressure supply source 59, as shown in FIG. 2, the hydraulic pressure that is supplied to the external circumferential hydraulic chamber 92 of the lock mechanism 9 becomes higher, and the thin barrel portion 95 of the cylindrical member 91 is elastically deformed so that its diameter is reduced, and the cylindrical clamp body 1 is solidly locked.

It should be understood that, when hydraulic pressure is supplied to the hydraulic pressure operation chamber 73, the accompanying supply of hydraulic pressure to the external circumferential hydraulic chamber 92 is delayed due to the throttling operation of the fine diameter hydraulic passage 97c. Due to this, it is possible to arrange for the elastic deformation of the thin barrel portion 95 of the cylindrical member 91 and the locking of the cylindrical clamp body 1 to be accompanied by a certain delay, after from the start the high hydraulic pressure that is capable of elastically deforming the thin barrel portion 95 of the cylindrical member 91 so as to reduce its diameter is supplied to the hydraulic pressure operation chamber 73, and the cylindrical clamp body 1 is driven forwards and its seating surfaces 14 are pressed against the surface to be supported S of the workpiece W.

After the cylindrical clamp body 1 has been locked, the high hydraulic pressure that is supplied to the hydraulic pressure operation chamber 73 is supplied to the hydraulic chamber for clamping 53 with a certain delay, due to the throttling operation of the hydraulic passage 52d of the annular piston member 52 and the annular gap. When this is done, the annular pressure reception member 61 and the support member 62 experience the hydraulic pressure of the hydraulic chamber for clamping 53 and are held at their upper limit positions, and the grip member 3 is also held at its upper limit position, but the clamp rod 4 is shifted downwards relatively to the grip member 3, since the annular piston member 52 experiences the high hydraulic pressure and is driven downwards against the resistance of the biasing force of the spring member 58.

As a result, as shown in FIG. 3, the four grip claw portions 32 of the grip member 3 are driven by the four tapered surfaces 45 of the tapered portion 43 of the clamp rod 4 so that their diameter is expanded, and are put into their state of gripping the inner circumferential surface of the aperture H of the workpiece W, so that it becomes impossible for the grip member 3 and the clamp rod 4 to shift relatively to the workpiece W. From this state, the annular piston member 52, the grip member 3, the clamp rod 4, the annular pressure reception member 61, and the support member 62 are driven downwards as an integral unit by just a small distance (for example 0.2 to 0.5 mm), and the workpiece W is put into the clamped state in which it is strongly pulled against the seating surfaces 14.

And, when the clamp device C is to be driven for unclamping, when the hydraulic pressure operation chamber 73 is vented to drain pressure, the annular piston member 52 and the clamp rod 4 are shifted upwards due to the biasing force of the spring member 58 of the forwards/backwards driving mechanism 5 and the gripping state of the grip member 3 is released, the hydraulic pressure is discharged from the external circumferential hydraulic chamber 92 and the fixation of the cylindrical clamp body 1 by the cylindrical member 91 is released, the piston member 72 is driven, downwards by the biasing force of the spring member 74 of the elevating/lowering driving mechanism 7, and the flange portion 81b of the flange shaped engagement member 81 is contacted from above against the intermediate wall portion 52b and the cylindrical clamp body 1 is shifted back downwards.

Next, the advantages of the clamp device C described above will be explained. By providing the seating surfaces 14 formed at the top end of the cylindrical clamp body 1 on which the article is seated, the case member 2 that supports the cylindrical clamp body 1 so that it can move forwards and backwards, and the elevating/lowering driving mechanism 7 that is capable of driving the cylindrical clamp body 1 with respect to the case member 2 so that it can be raised and lowered, in a direction parallel to the axis of the clamp rod 4, when starting driving for clamping, it is possible to elevate (i.e. to advance) the cylindrical clamp body 1 with respect to the case member 2, and to cause the seating surfaces 14 at the top end of the cylindrical clamp body 1 to come into contact against the workpiece W (i.e. the article). And, when clamping is to be released, the cylindrical clamp body 1 is lowered (i.e. is retracted) relative to the case member 2 by the elevating/lowering driving mechanism 7, so that it is possible for the seating surfaces 14 at the top end of the cylindrical clamp body 1 to be removed away from the workpiece W.

Since the cylindrical clamp body 1 has the cylindrical member 91 through which it is passed to slide freely and that is supported by the case member 2, and since the lock mechanism 9 is provided that is capable of locking the outer peripheral surface of the cylindrical clamp body 1 due to the cylindrical member 91 being elastically deformed so as to reduce its diameter, accordingly, by elastically deforming the cylindrical member 91 with the lock mechanism 9 so as to reduce its diameter, it is possible reliably to provide locking of the clamp body 1 by creating static frictional force against its outer peripheral surface.

Thus, when clamp driving starts, the cylindrical clamp body 1 is elevated by the elevating/lowering driving mechanism 7 so as to correspond to the height position of the surface to be supported S of the workpiece W, and it is possible to lock the cylindrical clamp body 1 with the lock mechanism 9 in the state in which the workpiece W is contacted against the seating surfaces 14 on the top end of the cylindrical clamp body 1, and thereafter the clamp rod 4 is shifted to the retraction side by the forwards/backwards driving mechanism 5 so that the diameter of the grip member 3 is expanded and it goes into the gripping state in which it bites into the inner circumferential surface of the aperture H in the workpiece W, and accordingly it is possible to ensure good planarity of the surface of the workpiece W that is to be machined, and it is possible to suppress deterioration of the processing accuracy due to elastic deformation of the workpiece W or due to chattering vibration.

And, since the elevating/lowering driving mechanism 7 has the hydraulic pressure cylinder 70 that is provided within the case member 2, the hydraulic pressure cylinder 70 has the hydraulic pressure operation chamber 73 to which hydraulic pressure is supplied, the piston member 72 that receives the hydraulic pressure in the hydraulic pressure operation chamber 73 and is driven to the advance side, and the spring member 74 that biases the piston member 72 towards the retraction side, and the piston member 72 has the piston rod 77 that is inserted into the annular piston member 52 of the forwards/backwards driving mechanism and moreover has the flange shaped engagement member 81 that is operatively linked to the annular piston member 52 at the end portion of the piston rod 77, accordingly when hydraulic pressure is supplied to the hydraulic pressure operation chamber 73, it is possible for the piston member 72 to be shifted to the advance side, and it is possible to shift the annular piston member 52 to the advance side via the flange shaped engagement member 81 of the piston rod 77. And, when the hydraulic pressure is discharged from the hydraulic pressure operation chamber 73, it is possible for the piston member 72 to be shifted to the retraction side by the spring member 74, and it is possible to shift the annular piston member 52 to the retraction side via the flange shaped engagement member 81.

Moreover, since the lock mechanism 9 has the thin barrel portion 95 that is formed on the cylindrical member 91 and is fitted on the outside of the cylindrical clamp body 1, the external circumferential hydraulic chamber 92 that is formed on the external circumferential side of the thin barrel portion 95, and the hydraulic pressure supply passage 93 that can supply hydraulic pressure to the external circumferential hydraulic chamber 92, accordingly, when hydraulic pressure is supplied to the external circumferential hydraulic chamber 92 by the hydraulic pressure supply passage 93, it is possible to elastically deform the thin barrel portion 95 so as to reduce its diameter, so that it is possible reliably to lock the cylindrical clamp body 1. And, since the hydraulic pressure supply passage 93 is a passage that communicates the external circumferential hydraulic chamber 92 with the hydraulic pressure operation chamber 73 of the hydraulic pressure cylinder 70, accordingly it is possible to supply hydraulic pressure from the common hydraulic pressure supply source 50.

Embodiment 2

While, in this embodiment, an example will be explained in which the clamp device C described above is partially altered, similar reference numerals will be appended to structural elements thereof that are similar to elements of the first embodiment, and explanation of those elements will be omitted, with only the structural elements that are different being explained. It should be understood that the clamp device CA of this second embodiment is one in which the construction of the lock mechanism 9 of the first embodiment described above is altered.

Figure 4:
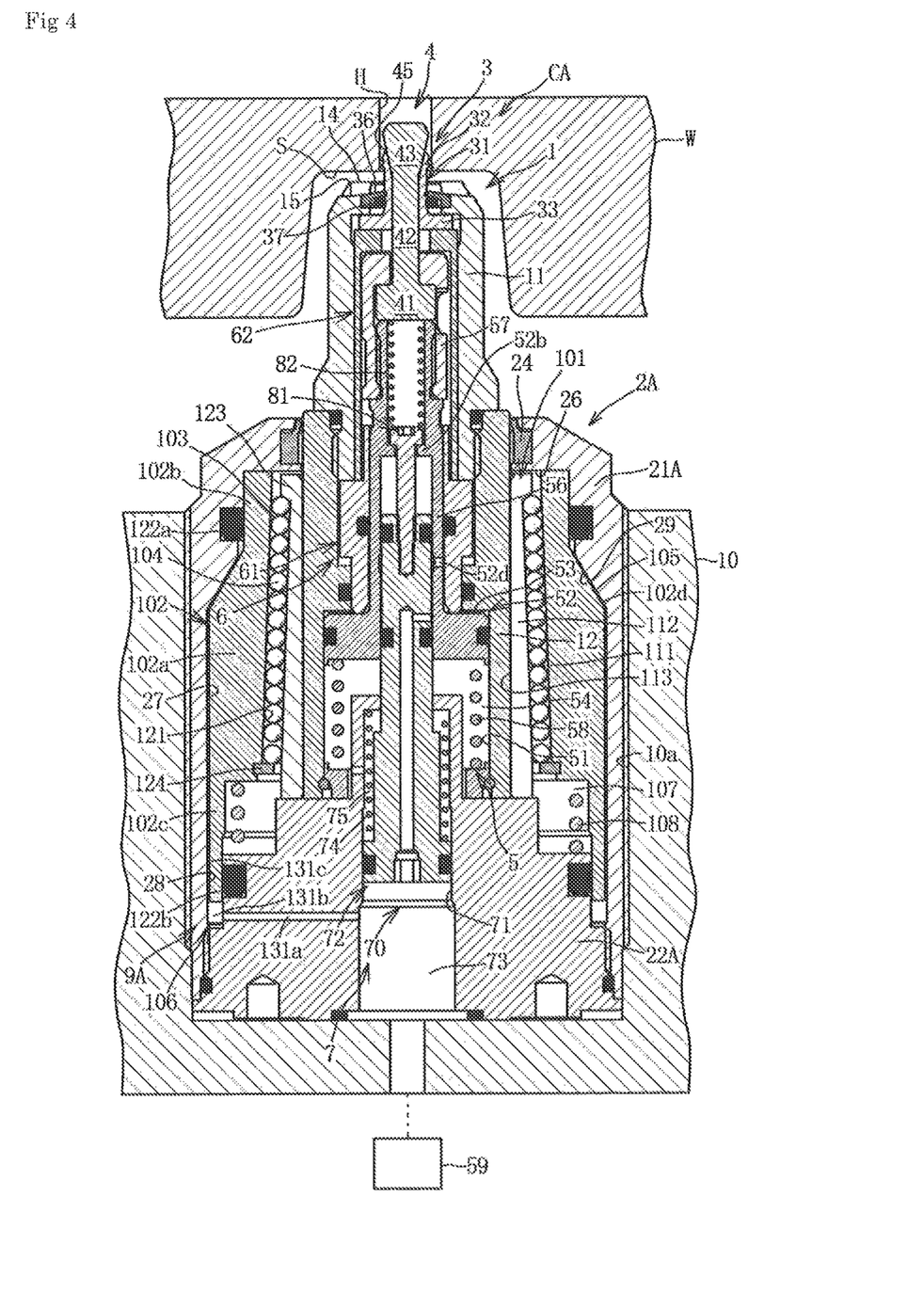
FIG. 4 is a sectional view of a clamp device in the unclamped state according to a second embodiment of the present invention.
Figure 5:
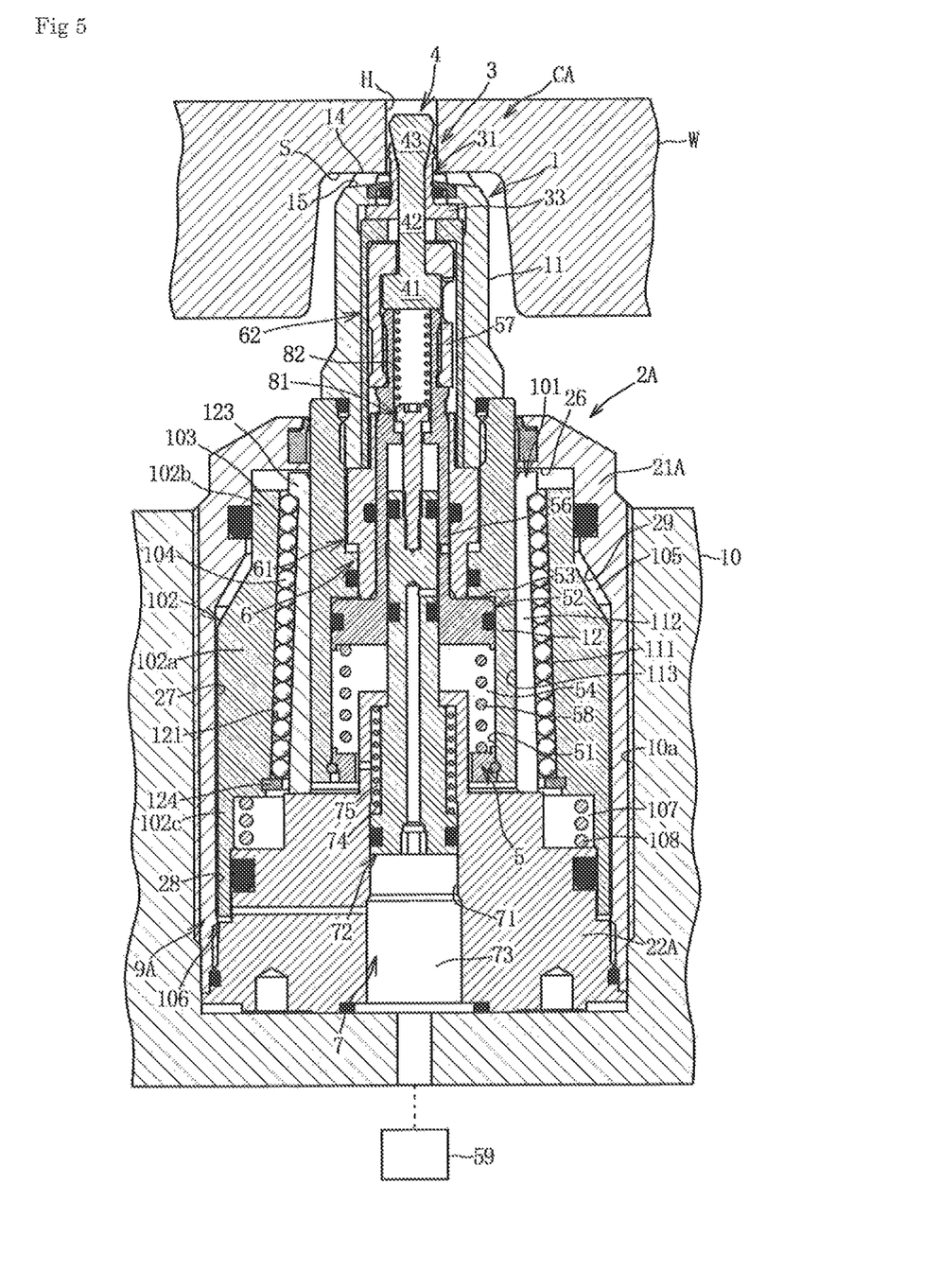
FIG. 5 is a sectional view of the clamp device in a state in which a) workpiece is contacted against a seating surface of a cylindrical clamp body and the cylindrical clamp body is in a state of being locked by a cylindrical member.
Figure 6:
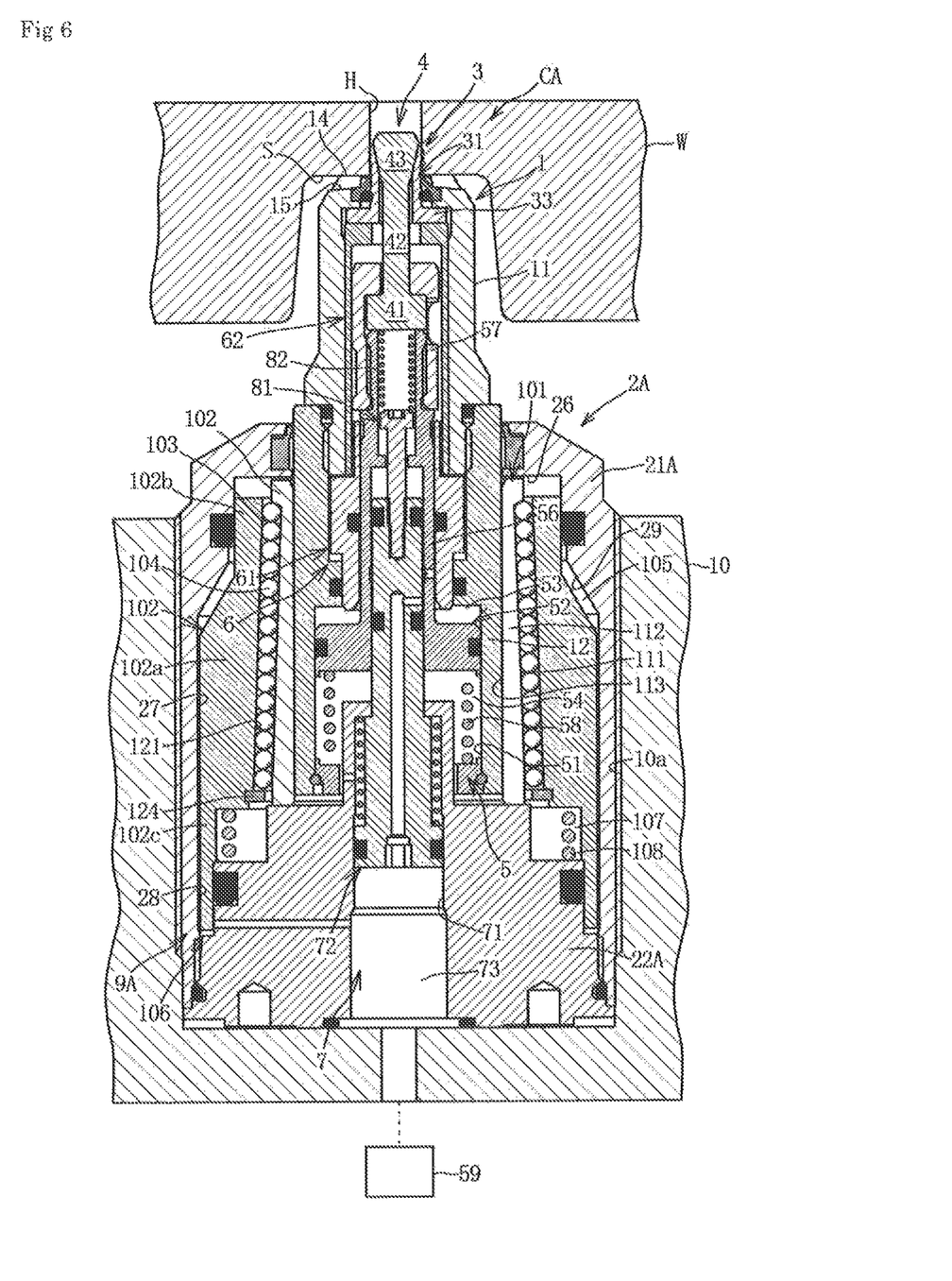
FIG. 6 is a sectional view of the clamp device in the clamped state.

As shown in FIGS. 4 through 6, this clamp device CA comprises a cylindrical clamp body 1, a case member 2A that supports the cylindrical clamp body 1 so that it can move forwards and backwards, the grip member 3, a clamp rod 4, a forwards/backwards driving mechanism 5, a support mechanism 6 that supports the clamp rod 4, an elevating/lowering driving mechanism 7, and a lock mechanism 9A, but, apart from the lock mechanism 9A, these elements are almost the same as in the first embodiment, and accordingly explanation thereof will be omitted.

The lock mechanism 9A comprises: a cylindrical member 101 into which the cylindrical clamp body 1 is inserted so that it can slide freely in a contacting state, and that is supported by the case member 2A; an annular member 102 having a tapered inner circumferential surface 121 that is disposed on the external peripheral side of the cylindrical member 101; a tapered annular gap 103 that is defined between the annular member 102 and the cylindrical member 101: a plurality of steel balls 104 (i.e. metallic spheres) that are interposed in the tapered annular gap 103; an annular hydraulic chamber 105 (i.e. an annular fluid chamber) that is defined on the external peripheral side of the annular member 102; a hydraulic pressure supply passage 106 (i.e. a second fluid pressure supply passage) that is capable of supplying hydraulic pressure (i.e. fluid pressure) to this annular hydraulic chamber 105; and a return spring 108 that biases the annular member 102 towards the lock release side.

The cylindrical member 101 is made from metal and is formed to be annular, and it has a tapered outer circumferential surface 111 that reduces in diameter towards its upper end, one or a plurality of slits 112 that extend in the vertical direction, and a through hole 113 through which the cylindrical clamp body 1 is passed; and it is closely contacted to the outer peripheral surface of the cylindrical clamp body 1 and is made so as to be capable of being elastically deformed so as to reduce its diameter. The lower end of the cylindrical member 101 is contacted against the upper surface of an intermediate step portion of the lower case member 22A, and a slight gap is defined between the upper end of the cylindrical member 101 and the upper wall portion of a concave cylinder portion 26 of the case member 2A.

The annular member 102 is formed integrally from a body barrel portion 102a, an upper barrel portion 102b that extends upwards from the upper end portion of the body barrel portion 102a, and a lower barrel portion 102c that extends downwards from the lower end portion of the body barrel portion 102a. The body barrel portion 102a is fitted into a reception hole 27 of the case member 2A so as to slide freely; the upper barrel portion 102b is fitted into the circular concave portion 26 of the case member 2A so as to slide freely; and the lower barrel portion 102c is inserted into the annular gap 28 so as to slide freely. A tapered inner circumferential surface 121 having diameter that reduces upwards is formed on the internal circumferential portion of the annular member 102, and, between this surface and the tapered outer circumferential surface 111, a tapered annular gap 103 is defined having thickness equal to the diameter of the steel balls 104, as will be described hereinafter. The annular member 102 is sealed in an oil tight manner by seal members 122a and 122b.

The plurality of steel balls 104 are installed in the tapered annular gap 103, and are in the state of being loaded in a closely contacting manner therein. An annular regulation portion 123 is formed at the upper end portion of the tapered outer circumferential surface 111 of the cylindrical member 101, and prevents the escape of the plurality of steel balls 104 upwards. And an annular ball reception member 124 is provided at the inner circumferential portion of a part of the annular member 102 near its lower end, and supports the plurality of steel balls 104 and prevents them escaping downwards.

The annular hydraulic chamber 105 is defined between the tapered outer circumferential surface 102d of the upper portion of the body barrel portion 102a and the annular tapered surface 29 of the upper end portion of the reception hole 27 of the cylindrical case member 21A. When hydraulic pressure is supplied to this annular hydraulic chamber 105, the annular member 102 is shifted relative to the cylindrical member 101 in a direction parallel to the axis of the clamp rod 4, whereby the cylindrical member 101 is elastically deformed so as to reduce its diameter.

Below the body barrel portion 102a of the annular member 102, an annular spring reception chamber 107 is defined between the annular member 102 and the lower case member portion 22A of the case member 2A. A return spring 108 is installed in the compressed state in this spring reception chamber 107. This return spring 108 elastically biases the annular member 102 upwards with respect to the cylindrical member 101.

A hydraulic pressure supply passage 106 is a passage that communicates the annular hydraulic chamber 105 with the hydraulic pressure operation chamber 73 of the hydraulic pressure cylinder 70. The hydraulic pressure supply passage 106 comprises a hydraulic passage 131a that is formed in a horizontal orientation in the lower case member portion 22A, an annular space 131b that is defined between the lower barrel portion 102c of the annular member 102 and the lower case member portion 102A, an annular gap 131c that is defined between the outer circumferential surface of the annular member 102 and the inner circumferential surface of the cylindrical case member 21A, and hydraulic pressure is supplied from the hydraulic pressure operation chamber 73 to the annular hydraulic chamber 105 via these hydraulic passages 131a, 131b and the annular gap 131c. When hydraulic pressure is supplied to the annular hydraulic chamber 105, the annular member 102 shifts downward, the tapered inner circumferential surface 121 engages with the tapered outer circumferential surface 111 via the plurality of steel balls 104, and the cylindrical member 101 is elastically deformed into a state in which its diameter is reduced, and thereby the cylindrical clamp body 1 is fixated solidly.

Next, the operation of the clamp device CA will be explained.

When a workpiece W that is to be supplied to machining is to be clamped by a plurality of the clamp devices CA, initially, as shown in FIG. 4, the hydraulic pressure in the hydraulic pressure operation chamber 73 of the elevating/lowering driving mechanism 7 is vented, to drain pressure. In this state, due to the biasing force of the spring member 58 of the forwards/backwards driving mechanism 5, the clamp rod 4, the grip member 3, the annular piston member 52, and the annular pressure reception member 61 are in their upper limit positions. The workpiece W is set on to the clamp device CA from above, and, after the external peripheral portion of the workpiece W has been fixated by a plurality of clamp devices other than the clamp device CA, not shown in the figures, then hydraulic pressure at a comparatively low pressure level (for example 1 MPa) is supplied from the hydraulic pressure supply source 59 to the hydraulic pressure operation chamber 73. It should be understood that the spring member 58 that is used in the forwards/backwards driving mechanism 5 and the return spring 108 that is used in the lock mechanism 9A have biasing forces that are greater than the drive forces in the downward direction that are exerted on the annular piston member 52 and the annular member 102 by this low hydraulic pressure.

When this is done, the hydraulic pressure cylinder 70 operates, and, along with the piston member 72 shifting upwards against the biasing force of the spring member 74, the flange shaped engagement member 81 moves away from the intermediate wall portion 52b and shifting forwards of the annular piston member 52 becomes possible. At this time, although the low hydraulic pressure is also supplied to the annular hydraulic chamber 105, the cylindrical clamp body/is not locked by the cylindrical member 101, since the annular member 102 is not shifted downwards by this low hydraulic pressure. Moreover, the annular piston member 52 does not shift downwards, since the biasing force of the spring member 58 of the forwards/backwards driving mechanism 5 is larger than the drive force generated by the low hydraulic pressure on the annular piston member 52. Accordingly, along with the clamp rod 4 being driven forwards (i.e. upwards) due to the weak elastic biasing force of the compact spring member 82, also the cylindrical clamp body 1 is driven forwards via the annular piston member 52 and the annular pressure reception member 61.

As a result, the seating surfaces 14 of the cylindrical clamp body 1 support the workpiece W while gently contacting against the surface to be supported S of the workpiece W with a weak force, and the cylindrical clamp body 1 is held in the stopped state. Since the seating surface of the cylindrical clamp body 1 is contacted lightly against the surface to be supported S of workpiece W, no elastic deformation of the workpiece W takes place. At this time, the boundary step portion of the piston member 72 between its large diameter rod portion 78 and its small diameter rod portion 79 shifts upwards so far as to contact against the upper wall portion of the cylindrical hole 71, but a large portion of the drive force of the piston member 72 in the upward direction is absorbed due to the shock absorption operation of the compact spring member 82. After the seating surfaces 14 of the cylindrical clamp body 1 have contacted against the surface to be supported S of the workpiece W, when a hydraulic pressure that is higher than the abovementioned low hydraulic pressure is supplied from the hydraulic pressure supply source 59, as shown in FIG. 5, this pressure is supplied to the annular hydraulic chamber 105 of the lock mechanism 9A, and, due to the annular member 102 shifting downward, the tapered outer circumferential surface 11 and the tapered inner circumferential surface 121 are engaged via the plurality of steel balls 104, so that the cylindrical member 101 is elastically deformed in the direction to reduce its diameter, and the cylindrical clamp body 1 is solidly locked.

After the cylindrical clamp body 1 has been locked, the high hydraulic pressure that is supplied to the hydraulic pressure operation chamber 73 is supplied to the hydraulic chamber for clamping 53 with a certain delay, due to the throttling operation of the hydraulic passage 52d of the annular piston member 52 and the annular gap and so on. When this is done, the annular pressure reception member 61 and the support member 62 experience the hydraulic pressure of the hydraulic chamber for clamping 53 and are held at their upper limit positions, and the grip member 3 is also held at its upper limit position, but the clamp rod 4 is shifted downwards relatively to the grip member 3, since the annular piston member 52 experiences the high hydraulic pressure and is driven downwards against the resistance of the biasing force of the spring member 58.

As a result, as shown in FIG. 6, the four grip claw portions 32 of the grip member 3 are driven by the four tapered surfaces 45 of the tapered portion 43 of the clamp rod 4 so that their diameter is expanded, and are put into their state in which they grip the inner circumferential surface of the aperture H of the workpiece W, so that it becomes impossible for the grip member 3 and the clamp rod 4 to shift relatively to the workpiece W. From this state, the annular piston member 52, the grip member 3, the clamp rod 4, the annular pressure reception member 61, and the support member 62 are driven downwards as an integral unit by just a small distance (for example 0.2 to 0.5 mm), and the workpiece W is put into the clamped state in which it is strongly pulled against the seating surfaces 14.

And, when the clamp device CA is to be driven for unclamping, when the hydraulic pressure operation chamber 73 is vented, to drain pressure, the annular piston member 52 and the clamp rod 4 are shifted upwards due to the biasing force of the spring member 58 of the forwards/backwards driving mechanism 5 and the gripping state of the grip member 3 is released, the annular member 102 is shifted upwards by the biasing force of the return spring 108, the hydraulic pressure is discharged from the annular hydraulic chamber 105 and the fixation of the cylindrical clamp body 1 by the cylindrical member 101 is released, the piston member 72 is driven downwards by the biasing force of the spring member 74 of the elevating/lowering driving mechanism 7, and the flange shaped engagement member 81 is contacted from above against the intermediate wall portion 52b and the cylindrical clamp body 1 is shifted back downwards.

Next, the advantage of the clamp device CA will be explained.

Since the lock mechanism 9A has one or a plurality of slits 112 and the tapered outer circumferential surface 111 that are formed in the cylindrical member 101, and the tapered inner circumferential surface 121 that is disposed on the external periphery of the cylindrical member 101, and moreover has the annular member 102 that is fitted into the case member 2A, the tapered annular gap 103 that is defined between the annular member 102 and the cylindrical member 101, the plurality of steel balls 104 that are fitted into the tapered annular gap 103, the annular hydraulic chamber 105 that is defined at the external periphery of the annular member 102, the hydraulic pressure supply passage 106 that is capable of supplying hydraulic pressure to the annular hydraulic chamber 105, and the return spring 108 that biases the annular member 102 to the lock release side, accordingly, when hydraulic pressure is supplied to the annular hydraulic chamber 105 via the hydraulic pressure supply passage 106, the tapered outer circumferential surface 111 and the tapered inner circumferential surface 121 are engaged together via the plurality of steel balls 104, and the cylindrical member 101 is elastically deformed so as to reduce its diameter, so that it is possible reliably to lock the cylindrical clamp body 1.

And, since the hydraulic pressure supply passage 106 is a passage that communicates the annular hydraulic chamber 105 with the hydraulic pressure operation chamber 73 of the hydraulic pressure cylinder 70, accordingly it is possible to supply hydraulic pressure from the common hydraulic pressure supply source 59. Since, when hydraulic pressure is supplied to the annular hydraulic chamber 105, the annular member 102 is shifted relatively to the cylindrical member 101 in the direction parallel to the axis of the clamp rod 4 whereby the cylindrical member 101 is elastically deformed so as to reduce its diameter, accordingly the cylindrical member 101 is elastically deformed by the annular member 102 so as to reduce its diameter, and it is possible reliably to lock the cylindrical clamp body 1. Since the other structures, the operation, and the advantages are the same as in the case of the first embodiment, explanation thereof will be omitted.

Next, variant examples in which the above embodiments are partially altered will be explained.

[1] While, with the clamp devices C and CA described in the above first and second embodiments, the hydraulic chamber for clamping 53 of the forwards/backwards driving mechanism 5, the hydraulic pressure operation chamber 73 of the elevating/lowering driving mechanism 7, and the external circumferential hydraulic chamber 92 and the annular hydraulic chamber 105 of the lock mechanisms 9 and 9A are incorporated in the same hydraulic system to which hydraulic pressure is supplied from a single hydraulic pressure supply source 59 via the hydraulic passage 10b of the base member 10, this is not to be considered as necessarily being limitative; it would also be acceptable for each of the driving mechanisms to be built to have an individually corresponding hydraulic pressure system.

[2] While hydraulic pressure is used for the clamp driving of the clamp devices C and CA described in the above first and second embodiments, this is not necessarily limitative; instead of the hydraulic chamber for clamping 53, the hydraulic pressure operation chamber 73, the external circumferential hydraulic chamber 92, and the annular hydraulic chamber 105, it would also be acceptable to provide an air chamber for clamping, an air pressure operation chamber, an external peripheral air chamber, and an annular air chamber, and to arrange for the piston member 72 to be driven for clamping by the use of a fluid pressure such as pressurized air or the like.

[3] In the clamp devices C and CA described in the above first and second embodiments, the constructions of the grip members 3, the constructions of the clamp rods 4, the constructions of the support mechanisms 6, the constructions of the forwards/backwards driving mechanisms 5, the constructions of the lock mechanisms 9 and 9A, and so on are only shown by way of example; it would be possible to implement various changes and/or additions to these constructions, within the range in which no deviation is made from the concept of the present invention. For other constructions for the clamp device as well, it would be possible to implement various changes and/or additions, within the range in which no deviation is made from the concept of the present invention.

The present invention can be applied to clamp devices of various types with which it is arranged to grip and clamp the peripheral surface of an aperture in a workpiece by expanding, with a clamp rod, the diameter of a grip claw portion of a grip member that is inserted into the aperture, for supplying the workpiece to machining; and, furthermore, these clamp devices may also be applied to the conveyance of workpieces or the like.

DESCRIPTION OF NUMERALS

W: workpiece (article)
C, CA: clamp device
1: cylindrical clamp body
2, 2A: case member
3: grip member
4: clamp rod
5: forwards/backwards driving mechanism
7: elevating/lowering driving mechanism
9, 9A: lock mechanism
14: seating surface
70: hydraulic pressure cylinder (fluid pressure cylinder)
71: cylindrical hole
72: piston member
73: hydraulic pressure operation chamber (fluid pressure operation chamber)
74: spring member
75: spring reception chamber
76: piston portion
77: piston rod
81: flange shaped engagement member
91: cylindrical member
92: external peripheral hydraulic chamber (external circumferential fluid chamber)
93: hydraulic pressure supply passage (first fluid pressure supply passage)
95: thin barrel portion
101: cylindrical member
102: annular member
103: tapered annular gap
104: steel ball (sphere made from metal)
105: annular hydraulic chamber (annular fluid chamber)
106: hydraulic pressure supply passage (second fluid pressure supply passage)
111: tapered outer circumferential surface
112: one or a plurality of slits
121 tapered inner circumferential surface

The invention claimed is:

1. A clamp device has a cylindrical clamp body having a vertical axis, a grip member that passes through a through hole in a top end portion of the cylindrical clamp body and extends to an exterior and is capable of gripping an inner circumferential surface of an aperture in an article, a clamp rod that is engaged with the grip member and extends in a vertical direction, and a forwards/backwards driving mechanism capable of driving the clamp rod forwards and backwards in the vertical direction, comprising:
   a seating surface formed at a top end of the cylindrical clamp body, on which the article is seated;
   a case member that supports the cylindrical clamp body so that the cylindrical clamp body can move forwards and backwards in the vertical direction;
   an elevating/lowering driving mechanism that is capable of driving the cylindrical clamp body with respect to the case member in a direction parallel to an axis of the clamp rod to move up and down; and
   a lock mechanism having a cylindrical member through which the cylindrical clamp body is passed so as to slide freely and which is supported by the case member, and that is capable of locking an outer circumferential surface of the cylindrical clamp body by elastically deforming the cylindrical member so as to reduce its diameter.

2. A clamp device according to claim 1; wherein the elevating/lowering driving mechanism comprises a fluid pressure cylinder that is provided within the case member;
   the fluid pressure cylinder comprises a fluid pressure operation chamber to which fluid pressure is supplied, a piston member that receives fluid pressure in the fluid pressure operation chamber and is thereby driven to an advance side, and a spring member that biases the piston member to a retraction side; and
   the piston member comprises a piston rod that is inserted into an annular piston member of the forwards/backwards driving mechanism and comprises a flange shaped engagement member at an end portion of the piston rod that is operatively linked to the annular piston member.

3. A clamp device has a cylindrical clamp body, a grip member that passes through a through hole in a top end portion of the cylindrical clamp body and extends to an exterior and is capable of gripping an inner circumferential surface of an aperture in an article, a clamp rod that is engaged with the grip member and extends in a vertical direction, and a forwards/backwards driving mechanism capable of driving the clamp rod forwards and backwards, comprising:
   a seating surface formed at a top end of the cylindrical clamp body, on which the article is seated;
   a case member that supports the cylindrical clamp body so that it can move forwards and backwards;
   an elevating/lowering driving mechanism that is capable of driving the cylindrical clamp body with respect to the case member in a direction parallel to an axis of the clamp rod to move up and down; and a lock mechanism having a cylindrical member through which the cylindrical clamp body is passed so as to slide freely and which is supported by the case member, and that is capable of locking an outer circumferential surface of the cylindrical clamp body by elastically deforming the cylindrical member so as to reduce its diameter; and wherein the lock mechanism comprises a thin barrel portion that is formed in the cylindrical member and is fitted over an exterior of the cylindrical clamp body, an external circumferential fluid chamber that is formed around an external circumference of the thin barrel portion, and a first fluid pressure supply passage that is capable of supplying fluid pressure to the external circumferential fluid chamber.

4. A clamp device according to claim 3; wherein the first fluid pressure supply passage is a passage that communicates the external circumferential fluid chamber and the fluid pressure operation chamber of the fluid pressure cylinder.

5. A clamp device has a cylindrical clamp body, a grip member that passes through a through hole in a top end portion of the cylindrical clamp body and extends to an exterior and is capable of gripping an inner circumferential surface of an aperture in an article, a clamp rod that is engaged with the grip member and extends in a vertical direction, and a forwards/backwards driving mechanism capable of driving the clamp rod forwards and backwards, comprising:

a seating surface formed at a top end of the cylindrical clamp body, on which the article is seated;

a case member that supports the cylindrical clamp body so that it can move forwards and backwards;

an elevating/lowering driving mechanism that is capable of driving the cylindrical clamp body with respect to the case member in a direction parallel to an axis of the clamp rod to move up and down; and a lock mechanism having a cylindrical member through which the cylindrical clamp body is passed so as to slide freely and which is supported by the case member, and that is capable of locking an outer circumferential surface of the cylindrical clamp body by elastically deforming the cylindrical member so as to reduce its diameter;

wherein the elevating/lowering driving mechanism comprises a fluid pressure cylinder that is provided within the case member;

wherein the fluid pressure cylinder comprises a fluid pressure operation chamber to which fluid pressure is supplied, a piston member that receives fluid pressure in the fluid pressure operation chamber and is thereby driven to an advance side, and a spring member that biases the piston member to a retraction side; and wherein the piston member comprises a piston rod that is inserted into an annular piston member of the forwards/backwards driving mechanism and comprises a flange shaped engagement member at an end portion of the piston rod that is operatively linked to the annular piston member; and wherein the lock mechanism comprises:

one or a plurality of slits and a tapered outer circumferential surface formed in the cylindrical member;

an annular member having a tapered inner circumferential surface that is disposed around an external periphery of the cylindrical member, and that is fitted into the case member;

a tapered annular gap that is defined between the annular member and the cylindrical member;

a plurality of metallic spheres that are fitted into the tapered annular gap;

an annular fluid chamber that is defined at an external peripheral side of the annular member;

a second fluid pressure supply passage that is capable of supplying fluid pressure to the annular fluid chamber; and a return spring that biases the annular member to a lock release side.

6. A clamp device according to claim 5; wherein the second fluid pressure supply passage is a passage that communicates the annular fluid chamber with the fluid pressure operation chamber of the fluid pressure cylinder.

7. A clamp device according to claim 5; wherein, when fluid pressure is supplied to the annular fluid chamber, the annular member is shifted relative to the cylindrical member in a direction parallel to an axis of the clamp rod, so that the cylindrical member is elastically deformed so that its diameter is reduced.

* * * * *